(12) United States Patent
Jansen et al.

(10) Patent No.: US 8,723,865 B1
(45) Date of Patent: May 13, 2014

(54) SYSTEM AND METHOD FOR RENDERING A VOLUMETRIC SHADOW

(75) Inventors: Jon Jansen, Theale (GB); Louis Bavoil, Theale (GB)

(73) Assignee: NVIDIA Corporation, Santa Clara, CA (US)

(*) Notice: Subject to any disclaimer, the term of this patent is extended or adjusted under 35 U.S.C. 154(b) by 339 days.

(21) Appl. No.: 12/852,181

(22) Filed: Aug. 6, 2010

(51) Int. Cl.
*G06T 15/50* (2011.01)
(52) U.S. Cl.
USPC .......................................................... 345/426
(58) Field of Classification Search
None
See application file for complete search history.

(56) References Cited

U.S. PATENT DOCUMENTS

| | | | | |
|---|---|---|---|---|
| 5,742,749 | A * | 4/1998 | Foran et al. | 345/426 |
| 6,760,024 | B1 * | 7/2004 | Lokovic et al. | 345/421 |
| 7,233,332 | B2 * | 6/2007 | Lokovic et al. | 345/426 |
| 2008/0174600 | A1 * | 7/2008 | Xie | 345/426 |
| 2009/0102844 | A1 * | 4/2009 | Deparis | 345/426 |
| 2009/0115784 | A1 * | 5/2009 | Tomite et al. | 345/426 |
| 2009/0195555 | A1 * | 8/2009 | Nystad et al. | 345/620 |

OTHER PUBLICATIONS

Keating, et al. "Shadow Penumbras for Complex Objects by Depth-Dependent Filtering of Multi-Layer Depth Images", ACM, SIGGRAPH '99 Conference, Los Angeles, CA, Aug. 8-13, 1999.*
Garrett, "Absorption and Transmission of Light and the Beer-Lambert Law", Lecture 21, Phy-1070 SG-6, Jun. 3, 2006, http://www.physics.uoguelph.ca/~pgarrett/teaching/PHY-1070/lecture-21.pdf; posted online as of Mar. 20, 2007.*
Keating, et al., "Shadow Penumbras for Complex Objects by Depth-Dependent Filtering of Multi-Layer Depth Images", ACM, SIGGRAPH '99 Conference, Los Angeles, CA, Aug. 8-13, 1999.*
A. Gelb and S. Gottlieb, "The Resolution of the Gibbs Phenomenon for Fourier Spectral Methods", In A. Jerri, Editor, Advances in the Gibbs Phenomenon. Sampling Publishing, Potsdam, New York, 2007.*
Annen et al., "Convolution Shadow Maps", Rendering Techniques 2007: Eurographics Symposium on Rendering, Jun. 2007.*
Shoeneman, "Painting with Light", SIGGRAPH '93 Proceedings of the 20th annual conference on Computer graphics and interactive techniques, pp. 143-146, ACM, 1993.*
Kniss, et al., "A model for volume lighting and modeling", IEEE Transactions on Visualization and Computer Graphics, 2003,150-162.*
Green et al. ("Representing Periodic Waveforms with Nonorthogonal Basis Functions", IEEE Transactions on Circuits and Systems, vol. Cas-31, No. 6, Jun. 1984).*
Annen, T., Mertens, T., Bekaert, P., Seidel, H.-P., and Kautz, J. 2007. Convolution shadow maps. In Rendering Techniques 2007: Eurographics Symposium on Rendering, Eurographics, J. Kautz and S. Pattanaik, Eds., vol. 18, 51-60.

(Continued)

*Primary Examiner* — Said Broome
*Assistant Examiner* — William Beutel
(74) *Attorney, Agent, or Firm* — Zilka-Kotab, PC

(57) ABSTRACT

A method for rendering a volumetric shadow includes defining a light source ray emanating from a light source, wherein the light source ray intersects a plurality of occluding primitives included within the scene. The method further includes computing an aggregate absorption function for the light source ray, whereby a per-primitive absorption function is computed for each of the plurality of occluding primitives intersecting the light source ray, and the resulting plurality of per-primitive absorption functions are summed to form an aggregate absorption function for the light source ray. A transmittance value is computed as a function of the aggregate absorption function, the transmittance value used to render the volumetric shadow within the scene.

22 Claims, 5 Drawing Sheets

(56) References Cited

OTHER PUBLICATIONS

Annen, T., Dong, Z., Mertens, T., Bekaert, P., Seidel, H.-P., and Kautz, J. 2008. Real-time, all-frequency shadows in dynamic scenes. ACM Trans. Graph. 27, 3, 1-8. Green, S., 2009. DirectX11 effects. GDC 2009.

Hadwiger, M., Kratz, A., Sigg, C., and B Uhler, K. 2006. Gpu-accelerated deep shadow maps for direct volume rendering. In Proceedings of the 21st ACM SIGGRAPH/Eurographics symposium on Graphics hardware.

Hal'En, H. 2007. Real-Time Hair Simulation and Visualisation for Games. Master's thesis, Lund University.

Kim, T.-Y., and Neumann, U. 2001. Opacity shadow maps. In Proceedings of the 12th Eurographics Workshop on Rendering Techniques, Jun. 25-27, 177-182.

Kniss, J., Premoze, S., Hansen, C., Shirley, P., and McPherson, A. 2003. A model for volume lighting and modeling. IEEE Transactions on Visualization and Computer Graphics 2003, 150-162.

Lokovic, T., and Veach, E. 2000. Deep shadow maps. In Proceedings of the 27th annual conference on Computer graphics and interactive techniques, 385-392.

Sintorn, E., and Assarsson, U. 2008. Real-time approximate sorting for self shadowing and transparency in hair rendering. In Proceedings of the 2008 Symposium on Interactive 3D Graphics and Games, Feb. 15-17, 2008, Redwood City, California.

Sintorn, E., and Assarsson, U. 2009. Hair self shadowing and transparency depth ordering using occupancy maps. In Proceedings of the 2009 Symposium on Interactive 3D Graphics and Games, Feb. 27-Mar. 1, 2009, Boston, Massachusetts.

Williams, L. 1978. Casting curved shadows on curved surfaces. In Proceedings of SIGGRAPH 1978, vol. 12, 270274.

Yuksel, C., and Keyser, J. 2008. Deep opacity maps. In Computer Graphics Forum 27(2): 675-680, (Proceedings of Eurographics 2008).

Nguyen, H. et al., "Hair Animation and Rendering in the Nalu Demo," Gpu Gems: Programming Techniques for High-Performance Graphics and General-Purpose Computation, Chapter 23, 2005, retrieved from http.developer.nvidia.com/GPUGems2/gpugems2_chapter23.html.

Green, S., "DirectX 10/11Visual Effects," GDC 2009, Mar. 23-27, 2009, retrieved from http://developer.download.nvidia.com/presentations/2009/GDC/NVIDIA_Effects_GDC09.pdf.

Mertens, T. et al., "A Self-Shadow Algorithm for Dynamic Hair using Density Clustering," Eurographics Symposium on Rendering, 2004, pp. 1-6.

\* cited by examiner

SYSTEM AND METHOD FOR RENDERING A VOLUMETRIC SHADOW

BACKGROUND

The present invention relates to systems and method for rendering images, and more particularly to systems and methods for rendering volumetric shadows in images.

A volumetric shadow is defined as the amount of light reaching any particular point in a scene along a ray of light traced between a light source and the particular point. Scattering effects may be ignored, thereby allowing an assumption that the light ray travels inside a translucent volume along a straight line. Thus, each fragment (e.g., a geometric primitive) that intersects the light ray attenuates the current light visibility by the transmittance T of the primitive, where $T=(1-\alpha)$ and $\alpha$ represents the primitive's opacity.

Several techniques for rendering volumetric shadows are known. Deep Shadow Mapping (T. Lokovic and E. Veach, "Deep Shadow Maps," in Proceedings of the 27th Annual Conference on Computer Graphcs and Interactive Techniques pgs. 385-392, 2000) represents a known technique in which all shadow-casting primitives (opaque and translucent) are captured using a linked list per pixel of arbitrary size. A disadvantage of this technique is the unbounded amount of memory needed for capturing the shadow-casting primitives, as well as the pre-filtering operations needed for the Deep Shadow Map, thus real-time processing cannot be guaranteed.

For real-time rendering, an approximation of Deep Shadow Mapping, referred to as Opacity Shadow Mapping, has been proposed based on the idea of discretizing the transmittance function of the primitives along light rays using predefined depth buckets (e.g., T. Kim and U. Neumann, "Opacity Shadow Maps," in Proceedings of the 12th Eurographics Workshop on Rendering Techniques, Jun. 25-27, 2001, pgs. 177-182). The buckets have a fixed memory cost and thus can run in real time. However, discretizing the transmittance function of the primitives into depth buckets causes discontinuities in the rendered shadows along the z-axis of the shadow map frustum. The challenge with this approach is how to limit undersampling artifacts when the density of depth buckets per light ray is not large enough to capture the complexity of the volume.

Half-angle slicing represents another approach to rendering volumetric shadows (J. Kniss, S. Premoze, C. Hansen, P. Shirley, and A. McPherson in "A Model for Volume Lighting and Modeling," in IEEE Transactions on Visualization and Computer Graphics 2003, pgs. 150-162). This approach has the advantage of using less memory than the Deep Opacity Mapping technique, but is expensive because it requires multiple geometry passes and render-target switches.

Accordingly, what is needed is a low-cost, memory and computationally efficient technique for rendering volumetric shadows accurately with minimal artifacts.

SUMMARY

The present invention provides for an improved system and method for rendering a volumetric shadow. In a particular embodiment, the method includes defining a light source ray emanating from a light source, wherein the light source ray intersects a plurality of occluding primitives included within the scene. The method further includes computing an aggregate absorption function for the light source ray, whereby a per-primitive absorption function is computed for each of the plurality of occluding primitives intersecting the light source ray, and the resulting plurality of per-primitive absorption functions are summed to form an aggregate absorption function for the light source ray. A transmittance value is computed based on the aggregate absorption function, the transmittance value used to render a volumetric shadow within the scene.

Figure 1:
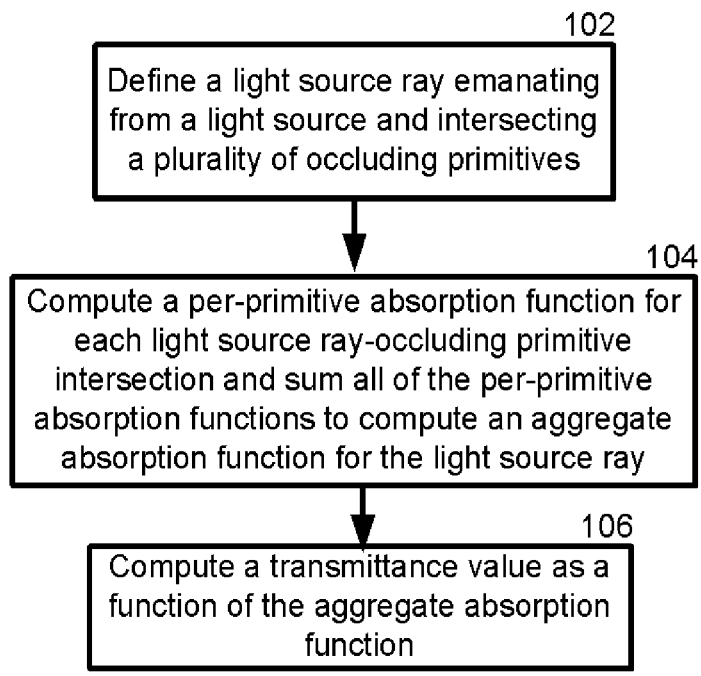
FIG. 1 illustrates a method for rendering a volumetric shadow in accordance with one embodiment of the present invention.

For clarity, previously identified features retain their reference indices in subsequent drawings.

DETAILED DESCRIPTION OF EXEMPLARY EMBODIMENTS

A ray of light is considered from a point light source as it passes through a translucent medium. The ray, r, is identified by its direction of departure from a point of interest. In a particular embodiment, the ray is identified by its (x,y) location in shadow space, and further, a point on the ray can be identified by a z value in the range [0,1], where 0 represents the closest point to the light source, and 1 the furthest.

It is desired to determine a transmittance for a given depth, d, on a given ray, r. The transmittance is defined as the ratio of light arriving directly at the given point, compared to the light entering the translucent medium along the ray:

$$T(r, d) = \frac{I(r, d)}{I_o(r)} \qquad \text{eq. (1)}$$

or, assuming that the transmittance T corresponds to a particular ray r:

$$T(d) = \frac{I(d)}{I_o} \qquad \text{eq. (2)}$$

For sufficiently translucent media with constant absorption, Beer's Law can be used as an approximation to T(d):

$$T(d) = \exp(-\sigma d) \qquad \text{eq. (3)}$$

This expression can be generalized to the variable absorption case by replacing the $\sigma d$ term with the integral of the absorption function along the path of the ray:

$$T(d) = \exp\left(-\int_0^d \sigma(z)\,dz\right) \quad \text{eq. (4)}$$

If the absorption function σ(z) is represented as an orthogonal series, for example, a Fourier series, certain advantages follow. For example, volumetric shadows (fog, smoke, hair, etc.) are characterized by light rays having a relatively smooth transmittance. Accordingly, a relatively small number of orthogonal components (e.g., two to ten Fourier coefficients) can be used to faithfully represent a typical transmittance function. Instead of discretizing the ray's transmittance function by projecting it onto a sub-division of depth, the ray's transmittance function can discretized by projecting it onto orthogonal components of an orthogonal series, for example, sine and cosine functions of a truncated Fourier series. Further advantageously, the truncated Fourier series is stable under translation and relatively insensitive to variations of the depth range. Also, the truncated Fourier series is always smooth (infinitely differentiable actually), whereas the conventional slice-based reconstructions have slope discontinuities which translate into visible discontinuities in the shadows. Moreover, the orthogonal components in accordance with the present invention may be expressed in a form which facilitate their computation, for example, within a single rasterization pass by using additive blending. The first n of such coefficients/weights can be stored to form an Inner Product Opacity Map (or, a "Fourier Opacity Map" when the orthogonal components are Fourier coefficients), and the map processed to render the volumetric shadow map.

In one exemplary embodiment in which the absorption function σ(z) is expressed as a Fourier series, the canonical projection and reconstruction for a Fourier expansion is as follows:

$$a_k = \frac{1}{\pi}\int_{-\pi}^{\pi} f(t)\cos(kt)\,dt \quad \text{eq. (5)}$$

$$b_k = \frac{1}{\pi}\int_{-\pi}^{\pi} f(t)\sin(kt)\,dt \quad \text{eq. (6)}$$

$$f(t) = \frac{a_0}{2} + \sum_{k=1}^{n} a_k\cos(kt) + \sum_{k=1}^{n} b_k\sin(kt) \quad \text{eq. (7)}$$

As variable z ranges from [0,1], the substitution t=π(1−2z) can be applied, giving the following equations:

$$a_k = 2\int_0^1 \sigma(z)\cos(2\pi kz - k\pi)\,dz \quad \text{eq. (8)}$$

$$b_k = 2\int_0^1 \sigma(z)\sin(2\pi kz - k\pi)\,dz \quad \text{eq. (9)}$$

$$\sigma(z) \approx \frac{a_0}{2} + \sum_{k=1}^{n} a_k\cos(2\pi kz - k\pi) + \sum_{k=1}^{n} b_k\sin(2\pi kz - k\pi) \quad \text{eq. (10)}$$

It is known that $\cos(\theta-k\pi)=(-1)^k\cos(\theta)$ and $\sin(\theta-k\pi)=(-1)^k\sin(\theta)$, and by applying definitions $a'_k=(-1)^k a_k$ and $b'_k=(-1)^k b_k$, the above equations can be reduced to:

$$a'_k = 2\int_0^1 \sigma(z)\cos(2\pi kz)\,dz \quad \text{eq. (11)}$$

$$b'_k = 2\int_0^1 \sigma(z)\sin(2\pi kz)\,dz \quad \text{eq. (12)}$$

$$\sigma(z) \approx \frac{a'_0}{2} + \sum_{k=1}^{n} a'_k\cos(2\pi kd) + \sum_{k=1}^{n} b'_k\sin(2\pi kd) \quad \text{eq. (13)}$$

Computation of the transmittance function using eq. (13) results in:

$$T(d) = \quad \text{eq. (14)}$$
$$\int_0^d \sigma(z)\,dz \approx \frac{a'_0}{2} + \sum_{k=1}^{n} \frac{a'_k}{2\pi k}\sin(2\pi kd) + \sum_{k=1}^{n} \frac{b'_k}{2\pi k}(1-\cos(2\pi kd))$$

The boundary conditions for the transmittance function of eq. (14) are retained:

$$T(0) = 1$$
$$T(1) = \exp\left(-\int_0^1 \sigma(z)\,dz\right)$$

In conventional rendering applications, the absorption function σ(z) is not provided in a form from which the orthogonal components $a'_k$ and $b'_k$ can be easily extracted. Instead, it is more common for a translucent medium to be represented by a large number of primitives (e.g., lines, points, polygons, etc.), and for the absorption properties of the medium to be implied by the variable opacity of the primitives.

The transmittance function for a single primitive can be expressed as:

$$T(d) = 1 \quad \text{if } d < d_0$$
$$1 - \alpha_0 \quad \text{if } d > d_0$$

This expression can be reformulated in terms of the generalized Beer's Law using the Dirac delta function:

$$T(d) = \exp\left(-\int_0^d \ln(1-\alpha_0)\delta(z-d_0)\,dz\right) \quad \text{eq. (15)}$$

For the contribution of multiple primitives i, eq. (15) can be generalized to the form:

$$T(d) = \exp\left(-\int_0^d \sum_i \ln(1-\alpha_i)\delta(z-d_i)\,dz\right), \text{i.e.} \quad \text{eq. (16)}$$

$$\sigma(z) = \sum_i \ln(1-\alpha_i)\delta(z-d_i) \quad \text{eq. (17)}$$

where $a_i$ and $d_i$ are the opacity and depth for the $i^{th}$ primitive, and the transmittance of the ray is computed at depth d.

Substituting eq. (17) into eqs. (11) and (12), and making use of the following property of the Dirac delta:

$$\int_{-\infty}^{\infty} f(x)\delta(x-c)dx = f(c), \qquad \text{eq. (18)}$$

eqs. (11) and (12) transform to:

$$a'_k = -2\sum_i \ln(1-\alpha_i)\cos(2\pi k d_i) \qquad \text{eq. (19)}$$

$$b'_k = -2\sum_i \ln(1-\alpha_i)\sin(2\pi k d_i) \qquad \text{eq. (20)}$$

where $a'_k$ and $b'_k$ are the orthogonal coefficients for the $k^{th}$ harmonic for a Fourier series employed as the orthogonal series, and where $a_i$ and $d_i$ represent the opacity and depth values of the $i^{th}$ primitive.

As will be further illustrated below, the orthogonal components $a'_k$ and $b'_k$ can be computed in accordance with eqs. (19) and (20) to form an opacity map, and the map rendered to a screen buffer using eq. (14) to form the volumetric shadow output to a display device.

While the foregoing operations have been described in terms of a Fourier series, any orthogonal basis/series $f_k(z)$ may be used as well. The orthogonal components of such a series can be calculated (e.g., in a pixel shader) in the same way as described above:

$$\delta a_{i,k} = -\ln(1-\alpha_i)f_k(d_i) \qquad \text{eq. (21)}$$

The transmittance approximation can be generalized to the form:

$$T(d) = \exp[-\Sigma a_k g_k(d)] \qquad \text{eq. (22)}$$

$$g_k(d) = \int_0^d f_k(z)dz \qquad \text{eq. (23)}$$

Preferably, basis functions $g_k(d)$ and $f_k(z)$ are chosen such that they can be efficiently computed in the shaders, i.e., they have analytical forms which can be easily constructed from the usual shader math primitives, e.g., multiplication, addition, sin/cos, exponentiation, logarithm, conditionals, etc.

As an example, slice-based opacity maps can be reformulated as an orthogonal basis using the following piecewise-constant basis functions:

$$f_k(z) = \sqrt{n}\left[H\left(z-\frac{k}{n}\right) - H\left(z-\frac{k+1}{n}\right)\right] \qquad \text{eq. (24)}$$

where $k=0, 1, \ldots (n-1)$. The analytical forms for the integrals of $f_k(z)$ used during reconstruction are given by:

$$g_k(d) = \sqrt{n}\left[\left(d-\frac{k}{n}\right)H\left(d-\frac{k}{n}\right) - \left(d-\frac{k+1}{n}\right)H\left(d-\frac{k+1}{n}\right)\right] \qquad \text{eq. (25)}$$

The representations in eqs. (24) and (25) may be further simplified to:

$$f_k(z) = H\left(z-\frac{k}{n}\right) - H\left(z-\frac{k+1}{n}\right) \qquad \text{eq. (26)}$$

$$g_k(d) = n\left[\left(d-\frac{k}{n}\right)H\left(d-\frac{k}{n}\right) - \left(d-\frac{k+1}{n}\right)H\left(d-\frac{k+1}{n}\right)\right] \qquad \text{eq. (27)}$$

where $H(x)$ is the Heaviside step function.

Pre-filtering may also be performed on the coefficient map. Assuming such operations take the form of a convolution, it is sufficient to consider the linear combination of two rays:

$$a'_k = (1-\lambda)a_k(r_o) + \lambda a_k(r_1) \qquad \text{eq. (28)}$$

Recalling that:

$$a_k(r) = \int_0^1 \sigma(r,z)f_k(z)dz \qquad \text{eq. (29)}$$

a result is obtained:

$$a'_k = \int_0^1 [(1-\lambda)\sigma(r_0,z) + \lambda\sigma(r_1,z)]f_k(z)dz \qquad \text{eq. (30)}$$

i.e., filtering the coefficients is equivalent to filtering the absorption functions:

$$\sigma'(z) = (1-\lambda)\sigma(r_o,z) + \lambda\sigma(r_1,z) \qquad \text{eq. (31)}$$

Recalling that the absorption function represents local density, it may therefore be concluded that a convolution filter applied to a coefficient map acts as if the filter were applied to the density of the participating medium. The same physical interpretation attaches to the filtering of opacity shadow maps.

GPU Implementation

In an exemplary implementation of the invention, primitives of the volumetric shadow are rendered to one or more textures within a graphics processing unit (GPU). For example, a set of coefficients $a'_k$ and $b'_k$ are computed using eqs. (19) and (20) within a pixel/fragment shader of the GPU. The coefficients (Fourier coefficients in this case) are compiled into an Orthogonal Opacity Map (or a Fourier Opacity Map in this case).

Next, the primitives are rendered to a screen buffer coupled to the GPU, whereby the transmittance values are computed based upon the set of orthogonal coefficients. Continuing with the above embodiment in which Fourier coefficients are used as the orthogonal components, transmittance values may be computed according to eq. (14) based upon a set of corresponding orthogonal components $a'_k$ and $b'_k$.

In comparison to prior art slice-based approaches which discretize depth values by partitioning rasterized primitives into depth buckets, the techniques of the present invention uses a continuous depth mapping. Ringing, to the extent it is present, can be reduced by increasing the number of orthogonal coefficients/components in the computation. Alternatively or additionally, the reconstructed transmittance can be clamped to the range of [0, 1] in the pixel/fragment shader in order to remove the overbrightening artifacts that could occur as a result of the ringing. This clamping technique provides a greater tolerance to ringing, thus saving the added computational expense which is carried with processing additional orthogonal coefficients. Outliers (primitives which are separated from a main group of primitives) which can create rendering errors in conventional techniques that rely upon initial passes to narrow the z-range (e.g., Deep Opacity Maps) are also advantageously processed using the present invention, in that the present invention weighs the contribution of the outlier to the transmittance function based upon the primitive density and opacity. Accordingly, outliers having relatively small density and opacity do not operate to skew the transmittance function in the present invention.

While the present invention is advantageously employed with thin, high frequency features such as clouds, smoke, steam, fog, and hair, it may also be used to render other types of opaque shadows as well. For example, transmittance values computed according to the opaque shadow-mapping techniques described by L. Williams in "Casting Curved Shadows on Curved Surfaces," Proceedings of SIGGRAPH 1978, vol. 12, 270274 can be modulated by the transmittance values computed in accordance with the present invention to arrive at a final transmittance value $T(r,d)$:

$$T(r,d) = T_{opaque}(r,d) T_{OOM}(r,d) \quad \text{eq. (32)}$$

where $T_{opaque}(r,d)$ represents transmittance values computed according to Williams' opaque shadow mapping technique, and $T_{OOM}(r,d)$ represents the transmittance values computed according to the orthogonal opacity mapping technique of the present invention.

FIG. 1 illustrates a method 100 for rendering a volumetric shadow within a scene in accordance with one embodiment of the present invention. At 102, a light source ray is defined emanating from a light source, wherein the light source ray intersects a plurality of occluding primitives included within the scene. As used herein, the term "occluding primitive" is a primitive which is operable to decrease the light level behind it (i.e., further away form the light source) compared to the light level in front of it (closer to the light source). Further exemplary, the term "occluded primitive" refers to a primitive whose light level has been reduced by an occluding primitive, i.e., a primitive which is located "behind" the occluding primitive, i.e., further away from the light source compared to the occluding primitive.

At 104, an aggregate absorption function for the light source ray is computed. Exemplary of this operation, a per-primitive absorption function is computed for each of the plurality of occluding primitives intersecting a particular light source ray, wherein a plurality of per-primitive absorption functions for the particular light source ray is computed. Next, the plurality of per-primitive absorption functions is summed to form an aggregate absorption function for the particular light source ray. At 106, a transmittance value for rendering a volumetric shadow is computed based on the aggregate absorption function.

Each of the occluding and occluded primitives included within the volumetric shadow may be of various types, for example, a line, a point, a polygon, a voxel etc. The shadow may include any number of primitives, for example, tens, hundreds, thousands, several thousands, millions, or more occluding and occluded primitives.

Exemplary of operation 102, at least one light source ray emanates from the source (e.g., a light source), although any number of rays may be employed. For example, tens, hundreds, thousands, millions, or more light source rays may emanate from the source according to operation 102. In the instance in which two or more light source rays are used, operations 104 and 106 may be (but not necessarily) carried out for each light source ray. In a particular embodiment in which multiple rays emanate from the source, at least one light source ray does not intersect with an occluding primitive.

Exemplary of operation 104, the per-primitive absorption function is expressed as a first weighted sum of predefined functions, and the aggregate absorption function is expressed as a second weighted sum of said predefined functions. In one example of this embodiment, a non-orthogonal basis set provides the predefined functions which compose the per-primitive and aggregate absorption functions. Any non-orthogonal basis set whose Gram matrix is invertible can be used.

In a further exemplary embodiment of operation 104, an orthogonal basis set provides the predefined functions which compose the per-primitive and aggregate absorption functions. In a specific implementation of this embodiment, the orthogonal basis set is Fourier series basis set having a DC term, a plurality of sine terms and a plurality of cosine terms. An exemplary embodiment of this representation is illustrated in eq. (13) above, in which the quantity $$\frac{a'_0}{2}$$

represents a sum of the DC terms, the quantity $$\sum_{k=1}^{n} b'_k \sin(2\pi k d)$$

represents a weighted sum of the plurality of sine terms, the quantity $$\sum_{k=1}^{n} a'_k \cos(2\pi k d)$$

represents a weighted sum of the plurality of cosine terms, and the quantity $\sigma(z)$ represents the aggregate absorption function. In accordance with this representation, the per-primitive absorption function is represented as the aforementioned DC, sine and cosine weights at a corresponding primitive index k. Further exemplary of operation 104, pre-filtering (as described above) can be applied to the aggregate absorption function.

Figure 2A:
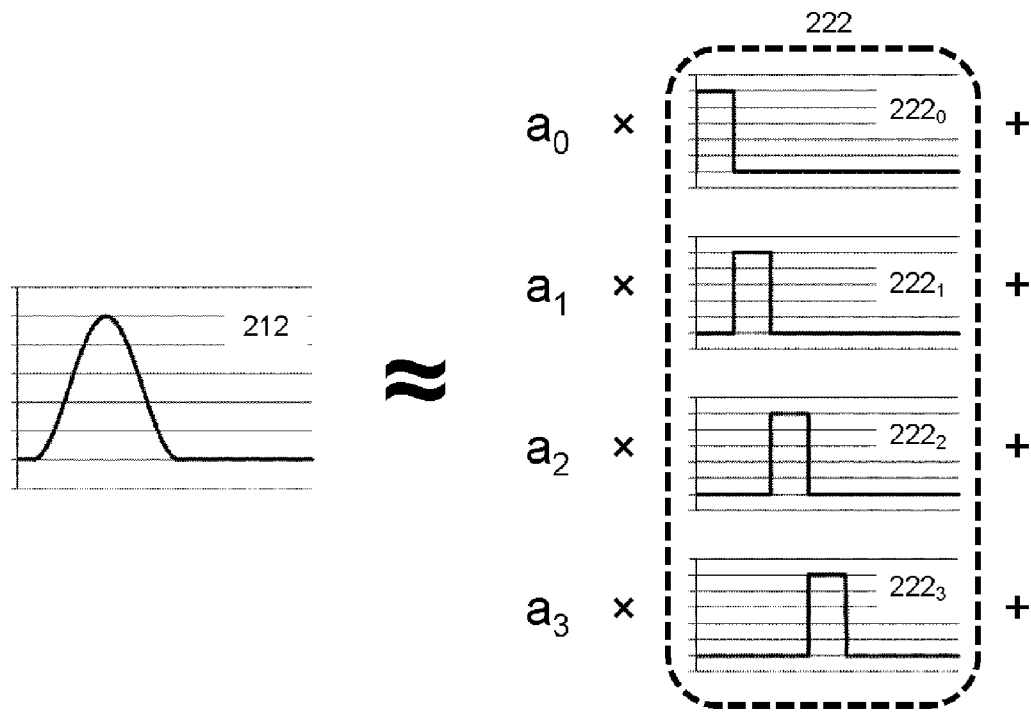
FIGS. 2A and 2B illustrate exemplary embodiments of per-primitive absorption functions computed in accordance with the present invention.
Figure 2B:
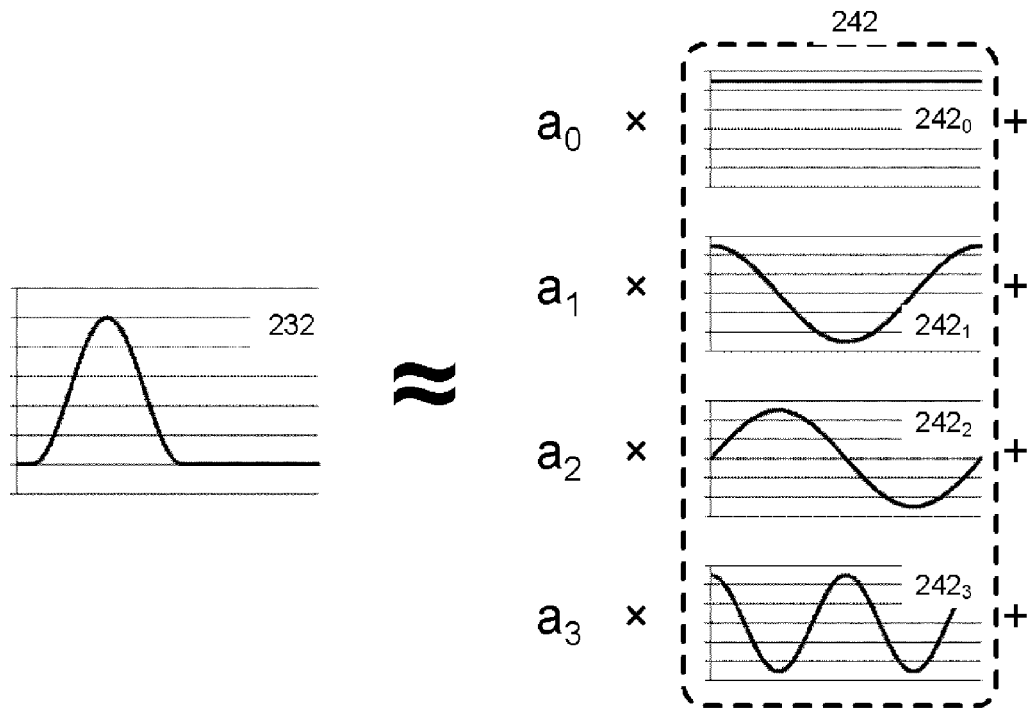

FIGS. 2A and 2B illustrate exemplary embodiments of per-primitive absorption functions computed in accordance with operation 104 in accordance with the present invention. Referring to FIG. 2A, the per-primitive absorption function 212 is represented as a weighted sum of predefined functions $222_0$-$222_3$, with respective weights $a_0$-$a_3$ applied thereto. The plurality of predefined functions $222_0$-$222_3$ collectively forms a basis set 222 of impulse occurring at different distances (along the x-axis) and at the same amplitudes (y-axis). The impulses forming the basis set 222 may be of arbitrary amplitude and/or extents. Additionally, while only four pre-defined functions are shown, any plurality of functions may be employed, e.g., 16, 32, 56, 256, 1028, or more. The weights/coefficients $a_0$-$a_3$ may be of any arbitrary value.

FIG. 2B illustrates another exemplary embodiment of a per-primitive absorption function 232 represented as a weighted sum of pre-defined functions $242_0$-$242_3$, with respective weights $a_0$-$a_3$ applied thereto. The plurality of pre-defined functions $242_0$-$242_3$ collectively forms a basis set 242 of one DC component/term $242_0$ and three sinusoidal components/terms $242_1$-$242_3$ of the same amplitude (y-axis). In particular, the second term $242_1$ is a first harmonic cosine term, the third term $242_2$ is a first harmonic sine term, and the fourth term $242_3$ is a second harmonic cosine term. Collectively, the DC term $242_0$ and the sine and cosine terms $242_1$-

$242_3$ form an orthogonal basis set, and more particularly, a Fourier series basis set, as described above. As will be understood, any number of harmonics of the sine and cosine terms may be used. In accordance with the above described embodiment, three harmonics of the sine and cosine terms may be used, which in addition to the DC term provides a seven term Fourier series basis set. The weights/coefficients $a_0$-$a_3$ may be of any arbitrary value.

Figure 2C:
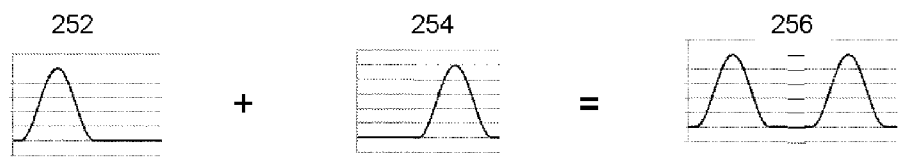
FIG. 2C illustrates an exemplary embodiment of an aggregate absorption function computed in accordance with the present invention.
Figure 2C:
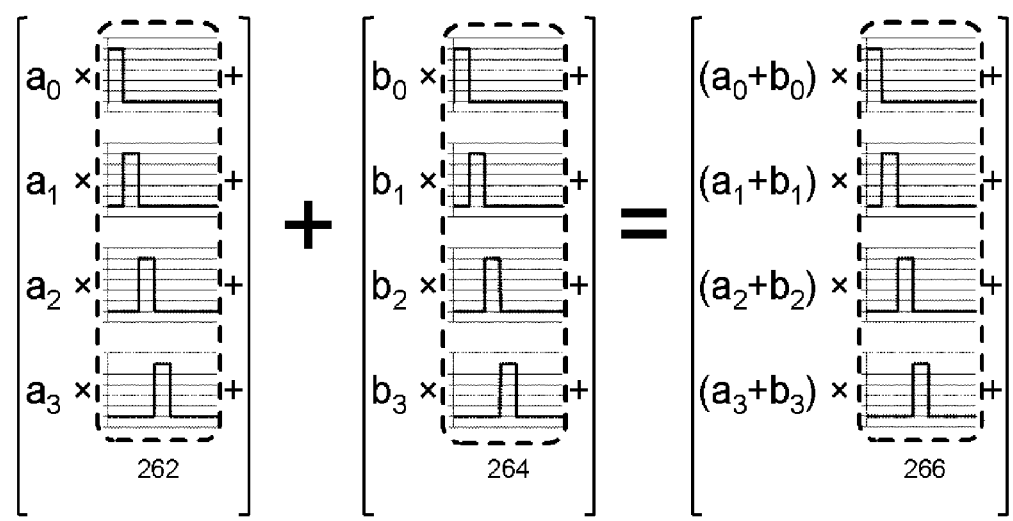

FIG. 2C illustrates an exemplary embodiment of an aggregate absorption function computed in accordance with operation 104 of the present invention. Two per-primitive absorption functions 252 and 254, corresponding to two distinct occluding primitives intersecting a light source ray, are shown. The two absorption functions 252 and 254 are shown as represented by corresponding basis sets 262 and 264, respectively, each composed of four impulse responses, although in another embodiment, the basis sets for each of the per primitive absorption functions are expressed as Fourier series basis sets, or as other orthogonal or non-orthogonal basis sets. Further exemplary, basis sets 262 and 264 are the same basis set.

The two absorption functions 252 and 254 are summed to form an aggregate absorption function 256. Exemplary, the basis function 266 of the aggregate absorption function 256 is a weighted sum of the per-primitive basis functions 262 and 264, as shown. Further particularly, the basis function 266 for the aggregate absorption function is the same basis function as implemented in the per-primitive basis functions 262 and 264. Implementation of the same basis set for each of the per-primitive and aggregate absorption functions provides computational efficiencies, as the same algorithm can be used to generate the respective absorption functions, and only the weights need to be computed, an embodiment of which is described above.

Figure 3:
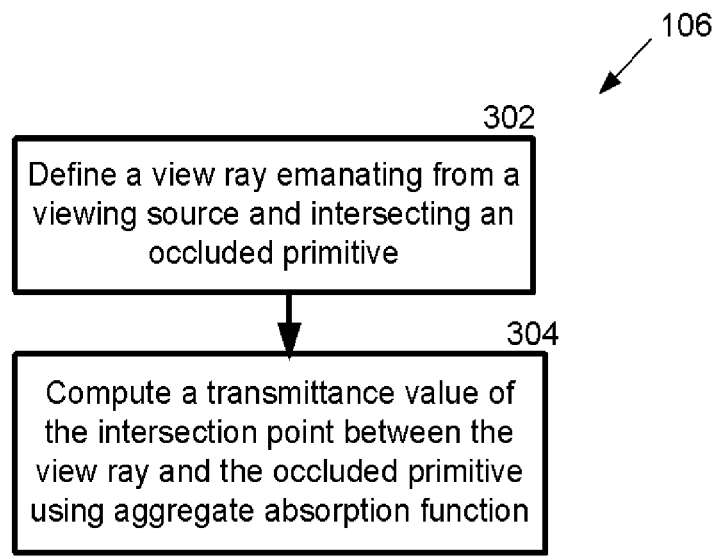
FIG. 3 illustrates an exemplary embodiment for computing a transmittance value in accordance with the present invention.

FIG. 3 illustrates an exemplary embodiment of operation 106 in which a transmittance value is computed for rendering the volumetric shadow within the scene. At 302, a view ray is defined emanating from a viewing source and towards an occluded primitive included within the scene, whereby the view ray intersects with the occluded primitive. The viewing source may represent a camera, a viewing perspective, or other monitoring apparatus.

At 304, a transmittance value is computed at the intersection point of the occluded primitive and the view ray using the aggregate absorption function. More particularly, the aggregate absorption function is operable to provide a transmittance value as a function of distance, and accordingly the transmittance value at the occluded primitive's intersection point with the view ray (i.e., the 3D point along the view ray) is computed with respect to a Euclidian distance between the light source and the view ray.

Figure 4:
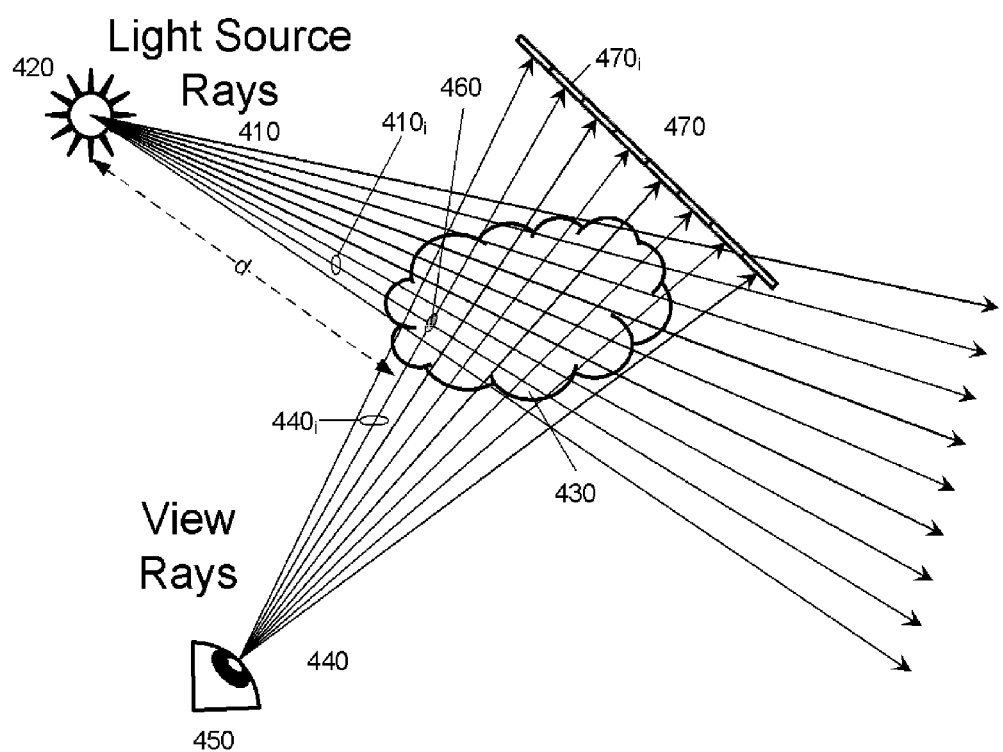
FIG. 4 illustrates operations shown in FIG. 3 in accordance with the present invention.

FIG. 4 illustrates operations 302 and 304 in accordance with the present invention. Light source rays 410 are defined as emanating from light source 420, at least one of which 410$_i$ intersects a plurality of occluding primitives, which is not shown, but which is included in cloud 430. A plurality of per-primitive absorption functions is computed, and the plurality summed to form an aggregate absorption function for a particular light source ray in accordance with operation 104.

Exemplary of operation 302, a view ray 440, is defined as emanating from a viewing source 450 and which intersects with an occluded primitive, shown as being within the locality of 460. The locality of 460 represents a point along the view ray 440, which is also either along the line of the light source ray 410$_i$, or which is more proximate to light source ray 410$_i$ than to any other light source ray 410. The occluded primitive is disposed along the view ray 410$_i$ and located behind (as seen from the light source 420) an occluding primitive in the scene, such that a shadow of the occluding primitive is cast upon the occluded primitive within the locality 460. Each of the view rays 440 is aligned to the center of respective pixels 470 operable to render the scene.

Exemplary of operation 304, a transmittance value is computed at the intersection point of the occluded primitive and the view ray 440$_i$ based on the aggregate absorption function, particularly with respect to the Euclidian distance d separating the light source 420 from the locality of 460, and more particularly, the occluded primitive. Accordingly, the value of the distance d is supplied to the aggregate absorption function, and a corresponding transmittance value is computed for the intersection point of the occluded primitive and the view ray 440$_i$. Further exemplary, the process may be repeated for one or more occluded primitives intersecting the view ray 440$i$. In such a case, corresponding transmittance values are computed, and the final transmittance value is determined, e.g., by means of alpha blending, for the particular pixel 470$_i$ corresponding to the view ray 440$_i$. The aforementioned processes may be repeated for one or more of the view rays 440, each providing a transmittance value for a respective pixel 470 for rendering the volumetric shadow.

In an alternative embodiment of the invention, the transmittance value for the intersection point is computed from a weighted sum of multiple aggregate absorption functions from multiple light source rays. For example, if the intersection point is located along a view ray and in the middle between the line of four light source rays, a further aggregate absorption function may be computed by bilinear interpolation of the aggregate absorption functions of the four rays, and the transmittance value for the intersection point computed from the interpolated aggregate absorption function.

Figure 5:
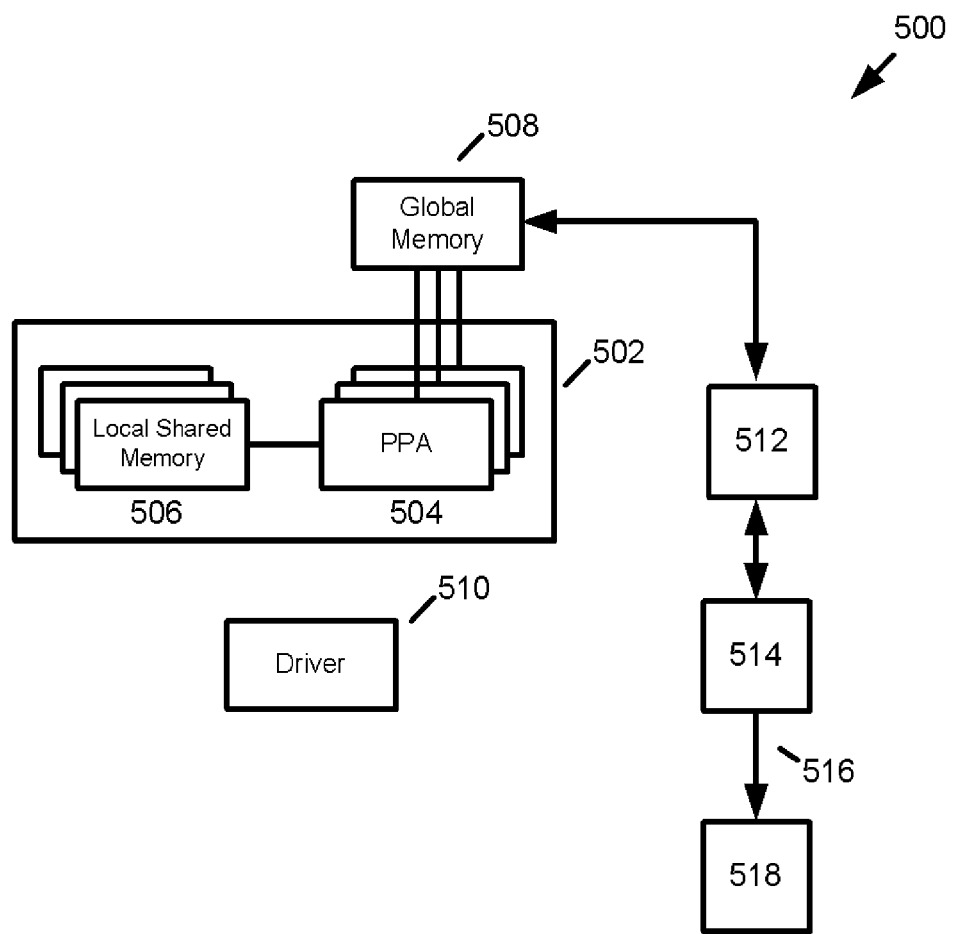
FIG. 5 illustrates a system operable to perform the operations of FIGS. 1 and 3 in accordance with the present invention.

FIG. 5 illustrates a system 500 operable to perform the operations of FIGS. 1 and 3 in accordance with the present invention. System 500 includes a processor 502, which includes a plurality of parallel processing architectures 504, each configured to operate on a predetermined number of threads. Accordingly, each parallel processing architecture 504 may operate in parallel, while the corresponding threads may also operate in parallel. In a particular embodiment, the parallel processing architecture 504 is a single instruction multiple data (SIMD) architecture of a predefined SIMD width, for example 32, 64, 128, 256 or more threads.

The system 500 may include a global memory 508 which is accessible to each of the parallel processing architectures 504. In a particular embodiment, the global memory 508 includes a frame/screen buffer in which the screen data is stored. The system 500 may further include one or more drivers 510 for controlling the operation of the processor 502 in accordance with the methods of FIGS. 1 and 3. The driver(s) 510 may include one or more libraries for facilitating control of the processor 502.

The system 500 may further include a memory interface 512 coupled to the global memory (frame buffer), a scan out processor 514 and a digital video interface (DVI) link 516 coupling the scan out processor 514 to a display device 518. In one embodiment, the system 500 is, or is included within in, a graphics card. In another embodiment, the system 500 is, or is included within, a motherboard of an imaging system, e.g., a digital camera. The system 500 may be implemented in other components, for example, a computer or a game console, or in an embedded system, such as in a cellular telephone, or internet device.

The processor 502 may include local shared memory 506, which may be physically or logically allocated to a corresponding parallel processing architecture 504. The processor 502 may further include a pixel/fragment shader, which may be a unified shader module that incorporates pixel, vertex, and geometry shader operations.

The system 500 is operable to perform (e.g., execute instructions to carry out) any of the operations illustrated in FIGS. 1 and 3 herein. In an embodiment exemplified by FIG. 1, circuitry of processor 502 (herein "processor circuitry") is operable to define a light source ray emanating from a light source, wherein the light source ray intersects a plurality of occluding primitives included within the scene. The processor circuitry is further operable to compute an aggregate absorption function for the light source ray, whereby a per-primitive absorption function is computed for each of the plurality of occluding primitives intersecting the light source ray, and the resulting plurality of per-primitive absorption functions are summed to form an aggregate absorption function for the light source ray. The processor circuitry is further operable to compute a transmittance value based on the aggregate absorption function, whereby the transmittance value used to render a volumetric shadow within the scene.

Exemplary of the operations illustrated in FIG. 3, the circuitry of processor 502 is further operable to define a view ray emanating from a viewing source and towards an occluded primitive included within the scene, wherein the view ray intersects with the occluded primitive. The processor circuitry is further operable to compute, as a function of the aggregate absorption function, a transmittance value of the intersection of the view ray with the occluded primitive. Further exemplary, the transmittance value is computed with respect to a Euclidian distance along the light source ray between the light source and the intersection.

In a specific embodiment, the system 500 is operable to render the volumetric shadow as a function of the plurality of transmittance values, whereby a pixel/fragment shader included within processor 502 operates to receive the computed transmittance values, and based thereon, computes corresponding color values for pixels of the corresponding view rays. In another embodiment, this operation additionally includes the process of writing the pixel data to a frame buffer of the system 300, e.g., the local memory 306 of the processor 302 or the global memory 308. In still another embodiment, this operation additionally includes writing the frame buffer out to the display device 318.

As readily appreciated by those skilled in the art, the described processes and operations may be implemented in hardware, software (a computer program element), firmware or a combination of these implementations as appropriate. In addition, some or all of the described processes and operations may be implemented as computer readable instruction code resident on a computer readable medium or product, the instruction code operable to control a computer of other such programmable device to carry out the intended functions. The computer readable medium on which the instruction code resides may take various forms, for example, a removable disk, volatile or non-volatile memory, etc.

The terms "a" or "an" are used to refer to one, or more than one feature described thereby. Furthermore, the term "coupled" or "connected" refers to features which are in communication with each other, either directly, or via one or more intervening structures or substances. The sequence of operations and actions referred to in method flowcharts are exemplary, and the operations and actions may be conducted in a different sequence, as well as two or more of the operations and actions conducted concurrently. The described features are not limited only to their implementation in the exemplary embodiment described therefor, and the skilled person will appreciate that these features can be implemented in the other described embodiments of the invention as well. Reference indices (if any) included in the claims serve to refer to one exemplary embodiment of a claimed feature, and the claimed feature is not limited to the particular embodiment referred to by the reference indicia. The scope of the clamed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method for rendering a volumetric shadow within a scene, the method comprising:
   (i) defining a light source ray emanating from a light source, wherein the light source ray intersects a plurality of occluding primitives included within the scene;
   (ii) computing an aggregate absorption function for the light source ray, comprising:
      (a) computing a per-primitive absorption function for each of the occluding primitives of the plurality of occluding primitives intersecting the light source ray, wherein a plurality of per-primitive absorption functions for the light source ray is computed, and each of the per-primitive absorption functions are computed using a same basis function; and
      (b) summing the plurality of per-primitive absorption functions to form an aggregate absorption function for the light source ray using the same basis function utilized to compute each of the per-primitive absorption functions that are summed to form the aggregate absorption function, and
   (iii) defining a view ray emanating from a viewing source and towards an occluded primitive included within the scene, wherein the view ray intersects with the occluded primitive, and computing, as a function of the aggregate absorption function, a transmittance value of the intersection of the view ray with the occluded primitive, wherein the transmittance value is used to render the volumetric shadow in the scene;
   wherein the transmittance value at the intersection of the view ray with the occluded primitive is computed with respect to a Euclidian distance along the light source ray between the light source and the occluded primitive;
   wherein the intersection of the view ray with the occluded primitive is located along the view ray and between a plurality of light source rays emanating from the light source that include the light source ray, wherein an interpolated aggregate absorption function is computed by interpolation of a plurality of aggregate absorption functions that include the aggregate absorption function, each aggregate absorption function of the plurality of aggregate absorption functions being calculated for one of the light source rays of the plurality of light source rays, and wherein the transmittance value at the intersection of the view ray with the occluded primitive is computed using the interpolated aggregate absorption function.

2. The method of claim 1, wherein the per-primitive absorption function comprises a first weighted sum of predefined functions, and the aggregate absorption function comprises a second weighted sum of said predefined functions.

3. The method of claim 2, wherein the predefined functions comprises a non-orthogonal basis set.

4. The method of claim 3, wherein the non-orthogonal basis set used for providing the predefined functions of the per-primitive absorption function and the aggregate absorption function includes an invertible Gram matrix.

5. The method of claim 2, wherein the predefined functions comprises an orthogonal basis set.

6. The method of claim 5, wherein the orthogonal basis set comprises a Fourier basis set having a dc term, a sine term and a cosine term.

7. The method of claim 5, wherein the predefined functions collectively form a basis set of one DC term, and three sinusoidal terms, including a first harmonic cosine term, a first harmonic sine term, and a second harmonic cosine term.

8. The method of claim 2, wherein said predefined functions form a basis set of impulses occurring at different distances along a first axis, and at a same amplitude along a second axis.

9. The method of claim 1, wherein (i) further comprises defining a second light source ray from the light source, wherein the second light source ray does not intersect an occluding primitive included within the scene.

10. The method of claim 1, wherein the transmittance value is a ratio of light arriving directly at a given point, compared to light entering a translucent medium along the light source ray.

11. The method of claim 1, wherein each of the plurality of per-primitive absorption functions is represented as $$\frac{a'_0}{2}, \sum_{k=1}^{n} b'_k \sin(2\pi kd),$$

and $$\sum_{k=1}^{n} a'_k \cos(2kd),$$

at a corresponding index k of one of the occluding primitives, wherein $$\frac{a'_0}{2}$$

represents a sum of DC terms, $a'_k$ and $b'_k$ are orthogonal coefficients for a $k^{th}$ harmonic for a Fourier series employed as an orthogonal series, and d is a depth at which the transmittance value is computed.

12. The method of claim 11, wherein, the orthogonal coefficients are computed as $$a'_k = -2 \sum_i \ln(1 - \alpha_i) \cos(2\pi k d_i)$$

and $$b'_k = -2 \sum_i \ln(1 - \alpha_i) \sin(2\pi k d_i)$$

within a pixel shader of a graphics processing unit (GPU), and the orthogonal coefficients are compiled into an orthogonal opacity map, wherein $a_i$ is an opacity of an $i^{th}$ primitive, and $d_i$ is a depth of the $i^{th}$ primitive.

13. The method of claim 12, wherein primitives are rendered to a screen buffer coupled to the GPU, and transmittance values for the primitives are computed based on the orthogonal coefficients.

14. The method of claim 1, wherein the occluded primitive is within a particular locality such that the view ray intersects with the occluded primitive within the particular locality, and the particular locality is a point along the view ray that is more proximate to the light source ray than to any other light source ray emanating from the light source.

15. A processor operable to render a volumetric shadow within a scene, the processor comprising:
(i) processor circuitry operable to define a light source ray emanating from a light source, wherein the light source ray intersects a plurality of occluding primitives included within the scene;
(ii) processor circuitry operable to compute an aggregate absorption function for the light source ray, comprising:
(a) processor circuitry operable to compute a per-primitive absorption function for each of the occluding primitives of the plurality of occluding primitives intersecting the light source ray, wherein a plurality of per-primitive absorption functions for the light source ray is computed, and each of the per-primitive absorption functions are computed using a same basis function; and
(b) processor circuitry operable to sum the plurality of per-primitive absorption functions to form an aggregate absorption function for the light source ray using the same basis function utilized to compute each of the per-primitive absorption functions that are summed to form the aggregate absorption function, and
(iii) processor circuitry operable to define a view ray emanating from a viewing source and towards an occluded primitive included within the scene, wherein the view ray intersects with the occluded primitive, and compute, as a function of the aggregate absorption function, a transmittance value of the intersection of the view ray with the occluded primitive, wherein the transmittance value is used to render the volumetric shadow in the scene;
wherein the processor is operable such that the transmittance value at the intersection of the view ray with the occluded primitive is computed with respect to a Euclidian distance along the light source ray between the light source and the occluded primitive;
wherein the intersection of the view ray with the occluded primitive is located along the view ray and between a plurality of light source rays emanating from the light source that include the light source ray, wherein an interpolated aggregate absorption function is computed by interpolation of a plurality of aggregate absorption functions that include the aggregate absorption function, each aggregate absorption function of the plurality of aggregate absorption functions being calculated for one of the light source rays of the plurality of light source rays, and wherein the transmittance value at the intersection of the view ray with the occluded primitive is computed using the interpolated aggregate absorption function.

16. The processor of claim 15, wherein the per-primitive absorption function comprises a first weighted sum of predefined functions, and the aggregate absorption function comprises a second weighted sum of said predefined functions.

17. The processor of claim 16, wherein the predefined functions comprises a non-orthogonal basis set.

18. The processor of claim 16, wherein the predefined functions comprises a Fourier basis set having a dc term, a plurality of sine terms and a plurality of cosine terms.

19. The processor of claim 16, wherein (i) processor circuitry further comprises processor circuitry operable to define a second light source ray emanating from the light source, wherein the second light source ray does not intersect an occluding primitive included within the scene.

20. A computer program product, resident on a non-transitory computer readable medium, and operable to execute instructions for rendering a volumetric shadow within a scene, the computer program product comprising:
   (i) instruction code for defining a light source ray emanating from a light source, wherein the light source ray intersects a plurality of occluding primitives included within the scene;
   (ii) instruction code for computing an aggregate absorption function for the light source ray, comprising:
      (a) instruction code for computing a per-primitive absorption function for each of the occluding primitives of the plurality of occluding primitives intersecting the light source ray, wherein a plurality of per-primitive absorption functions for the light source ray is computed and each of the per-primitive absorption functions are computed using a same basis function; and
      (b) instruction code for summing the plurality of per-primitive absorption functions to form an aggregate absorption function for the light source ray using the same basis function utilized to compute each of the per-primitive absorption functions that are summed to form the aggregate absorption function, and
   (iii) instruction code for defining a view ray emanating from a viewing source and towards an occluded primitive included within the scene, wherein the view ray intersects with the occluded primitive, and computing, as a function of the aggregate absorption function, a transmittance value of the intersection of the view ray with the occluded primitive, wherein the transmittance value is used to render the volumetric shadow in the scene;
wherein the computer program is operable such that the transmittance value at the intersection of the view ray with the occluded primitive is computed with respect to a Euclidian distance along the light source ray between the light source and the occluded primitive;
wherein the intersection of the view ray with the occluded primitive is located along the view ray and between a plurality of light source rays emanating from the light source that include the light source ray, wherein an interpolated aggregate absorption function is computed by interpolation of a plurality of aggregate absorption functions that include the aggregate absorption function, each aggregate absorption function of the plurality of aggregate absorption functions being calculated for one of the light source rays of the plurality of light source rays, and wherein the transmittance value at the intersection of the view ray with the occluded primitive is computed using the interpolated aggregate absorption function.

21. The computer program product of claim 20, wherein the per-primitive absorption function comprises a first weighted sum of predefined functions, and the aggregate absorption function comprises a second weighted sum of said predefined functions.

22. The computer program product of claim 21, wherein the predefined functions comprises a Fourier basis set having a dc term, a plurality of sine terms and a plurality of cosine terms.

* * * * *